United States Patent
Sung et al.

(10) Patent No.: US 10,172,122 B1
(45) Date of Patent: Jan. 1, 2019

(54) IDENTIFICATION OF UPLINK INTERFERENCE IN A LONG-TERM EVOLUTION (LTE) COMMUNICATION SYSTEM

(71) Applicant: Sprint Communications Company L.P., Overland Park, KS (US)

(72) Inventors: Sanghoon Sung, Ashburn, VA (US); Bharatwajan Raman, Arlington, VA (US); Dhaval Dipak Mehta, Aldie, VA (US); Walter F. Rausch, Shawnee, KS (US)

(73) Assignee: Sprint Communications Company L.P., Overland Park, KS (US)

(*) Notice: Subject to any disclaimer, the term of this patent is extended or adjusted under 35 U.S.C. 154(b) by 353 days.

(21) Appl. No.: 15/013,421

(22) Filed: Feb. 2, 2016

(51) Int. Cl.
 *H04W 72/04* (2009.01)
 *H04W 72/12* (2009.01)
 *H04W 72/08* (2009.01)

(52) U.S. Cl.
 CPC ..... *H04W 72/042* (2013.01); *H04W 72/0453* (2013.01); *H04W 72/082* (2013.01); *H04W 72/121* (2013.01); *H04W 72/04* (2013.01)

(58) Field of Classification Search
 CPC .......... H04W 72/042; H04W 72/0453; H04W 72/04; H04W 72/082; H04W 72/12; H04W 72/121
 USPC ........................................................ 370/329
 See application file for complete search history.

(56) References Cited

U.S. PATENT DOCUMENTS

| | | | |
|---|---|---|---|
| 8,072,918 B2 | 12/2011 | Muharemovic et al. | |
| 8,248,941 B2 | 8/2012 | Teyeb et al. | |
| 8,855,072 B2 | 10/2014 | Moon et al. | |
| 9,066,365 B2 | 6/2015 | Kim et al. | |
| 2007/0042784 A1 | 2/2007 | Anderson | |
| 2007/0147341 A1* | 6/2007 | Izumikawa | H04L 47/10 370/351 |
| 2010/0304665 A1 | 12/2010 | Higuchi | |
| 2011/0310789 A1 | 12/2011 | Hu et al. | |
| 2012/0099520 A1* | 4/2012 | Kwon | H04B 7/155 370/315 |
| 2012/0195210 A1* | 8/2012 | Grayson | H04W 52/244 370/252 |

(Continued)

FOREIGN PATENT DOCUMENTS

| | | | | |
|---|---|---|---|---|
| CN | 103856945 | | 6/2014 | |
| WO | WO-2016179832 A1 * | | 11/2016 | ............ H04W 88/04 |

*Primary Examiner* — Michael Thier
*Assistant Examiner* — Rownak Islam

(57) ABSTRACT

An LTE base station to facilitate identification of uplink interference serves a plurality of UE devices and one or more relay nodes. The LTE base station is configured to identify a first scheduling group comprising the plurality of UE devices and a second scheduling group comprising the one or more relay nodes based on LTE registration data, allocate uplink resource blocks by scheduling a first portion of the uplink resource blocks at one end of a channel spectrum to the UE devices in the first scheduling group and scheduling a second portion of the uplink resource blocks at the other end of the channel spectrum to the one or more relay nodes in the second scheduling group, and monitor for interference in the second portion of the uplink resource blocks to determine if the interference is associated with the one or more relay nodes in the second scheduling group.

20 Claims, 5 Drawing Sheets

(56) References Cited

U.S. PATENT DOCUMENTS

| | | |
|---|---|---|
| 2012/0238202 A1* | 9/2012 | Kim .................. H04W 72/1231 455/7 |
| 2012/0300616 A1 | 11/2012 | Zeng et al. |
| 2013/0322322 A1 | 12/2013 | Redana et al. |
| 2014/0133387 A1 | 5/2014 | Wagner et al. |
| 2014/0198716 A1 | 7/2014 | Speight et al. |
| 2015/0029950 A1 | 1/2015 | Rath et al. |

* cited by examiner

IDENTIFICATION OF UPLINK INTERFERENCE IN A LONG-TERM EVOLUTION (LTE) COMMUNICATION SYSTEM

TECHNICAL BACKGROUND

Wireless communication systems typically include wireless access nodes which provide access to communication services for wireless communication devices over wireless links. A typical wireless communication system includes systems to provide wireless access across a geographic region, with different wireless coverage areas associated with individual wireless access nodes. The wireless access systems exchange communications between wireless communication devices, service providers, and other network elements. The communications typically include voice calls, data exchanges, web pages, streaming media, text messages, and other communication services. The wireless communication devices utilize "forward link" or "downlink" communication channels to receive voice and/or data transmitted from the wireless access node, and "reverse link" or "uplink" communication channels to transmit information up to the node.

In Long-Term Evolution (LTE) communication systems, a wireless communication device is referred to as User Equipment (UE), while a wireless access node is called an enhanced Node B (eNodeB). In some situations, a relay node is also utilized to relay communications between an eNodeB and outlying UE devices that do not receive good coverage from the eNodeB but are within range of the relay node. The relay node effectively enables a wireless backhaul solution to transmit communications between connected UE devices and the eNodeB so that communication services may be provided to the UE devices.

Overview

A method of operating a Long-Term Evolution (LTE) base station to facilitate identification of uplink interference is disclosed, wherein the LTE base station serves a plurality of User Equipment (UE) devices and one or more relay nodes. The method comprises identifying a first scheduling group comprising the plurality of UE devices and a second scheduling group comprising the one or more relay nodes based on LTE registration data. The method further comprises allocating uplink resource blocks by scheduling a first portion of the uplink resource blocks at one end of a channel spectrum to the UE devices in the first scheduling group and scheduling a second portion of the uplink resource blocks at the other end of the channel spectrum to the one or more relay nodes in the second scheduling group. The method further comprises monitoring for interference in the second portion of the uplink resource blocks to determine if the interference is associated with the one or more relay nodes in the second scheduling group.

An LTE base station to facilitate identification of uplink interference comprises a processing system. The LTE base station serves a plurality of UE devices and one or more relay nodes. The processing system is configured to identify a first scheduling group comprising the plurality of UE devices and a second scheduling group comprising the one or more relay nodes based on LTE registration data, allocate uplink resource blocks by scheduling a first portion of the uplink resource blocks at one end of a channel spectrum to the UE devices in the first scheduling group and scheduling a second portion of the uplink resource blocks at the other end of the channel spectrum to the one or more relay nodes in the second scheduling group, and monitor for interference in the second portion of the uplink resource blocks to determine if the interference is associated with the one or more relay nodes in the second scheduling group.

A computer apparatus to operate an LTE base station to facilitate identification of uplink interference comprises software instructions and at least one non-transitory computer-readable storage medium storing the software instructions, wherein the LTE base station serves a plurality of UE devices and one or more relay nodes. The software instructions are configured, when executed by the LTE base station, to direct the LTE base station to identify a first scheduling group comprising the plurality of UE devices and a second scheduling group comprising the one or more relay nodes based on LTE registration data. The software instructions are further configured to direct the LTE base station to allocate uplink resource blocks by scheduling a first portion of the uplink resource blocks at one end of a channel spectrum to the UE devices in the first scheduling group and scheduling a second portion of the uplink resource blocks at the other end of the channel spectrum to the one or more relay nodes in the second scheduling group. The software instructions are further configured to direct the LTE base station to monitor for interference in the second portion of the uplink resource blocks to determine if the interference is associated with the one or more relay nodes in the second scheduling group.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
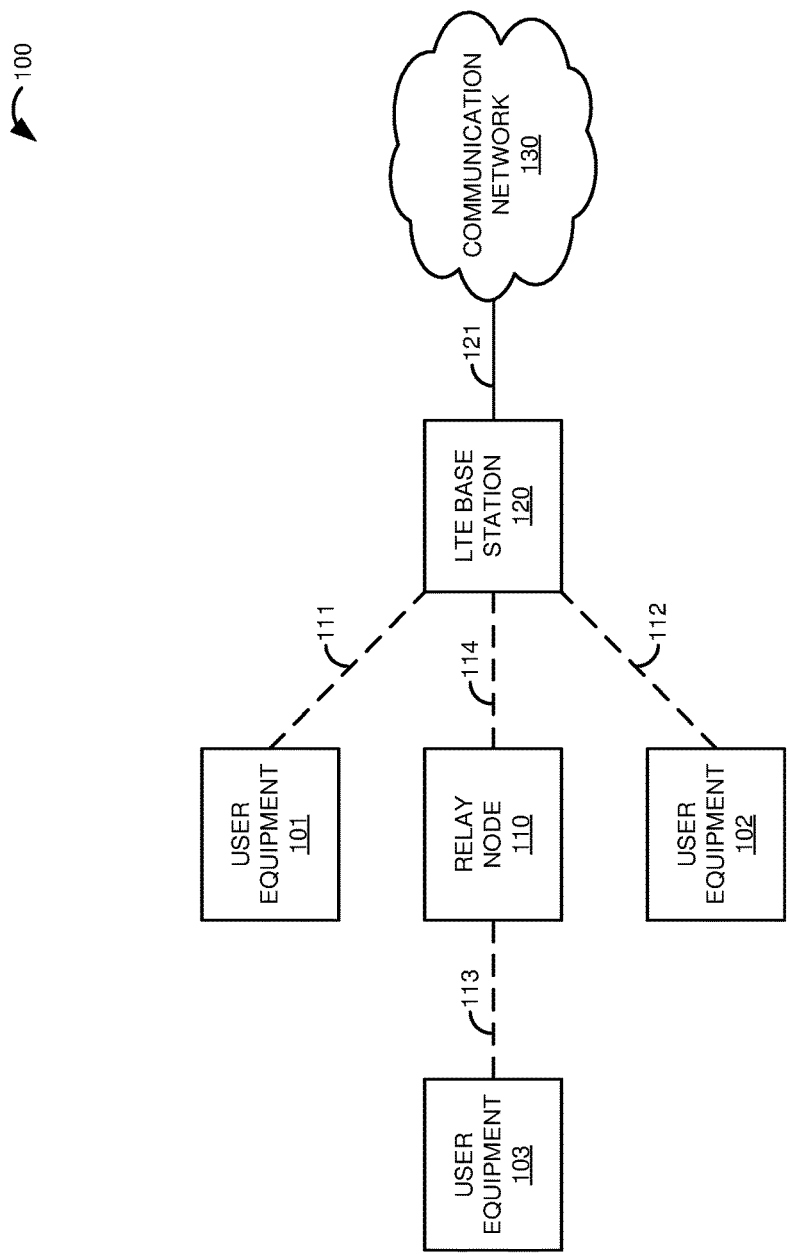
FIG. 1 is a block diagram that illustrates an LTE communication system.

FIG. 1 is a block diagram that illustrates Long-Term Evolution (LTE) communication system 100. LTE communication system 100 includes User Equipment (UE) 101-103, relay node 110, LTE base station 120, and LTE communication network 130. UE 101 and LTE base station 120 communicate over wireless communication link 111. UE 102 and LTE base station 120 communicate over wireless communication link 112. UE 103 and relay node 110 are in communication over wireless communication link 113, while relay node 110 and LTE base station 120 communicate over wireless communication link 114. LTE base station 120 and LTE communication network 130 communicate over communication link 121.

Figure 2:
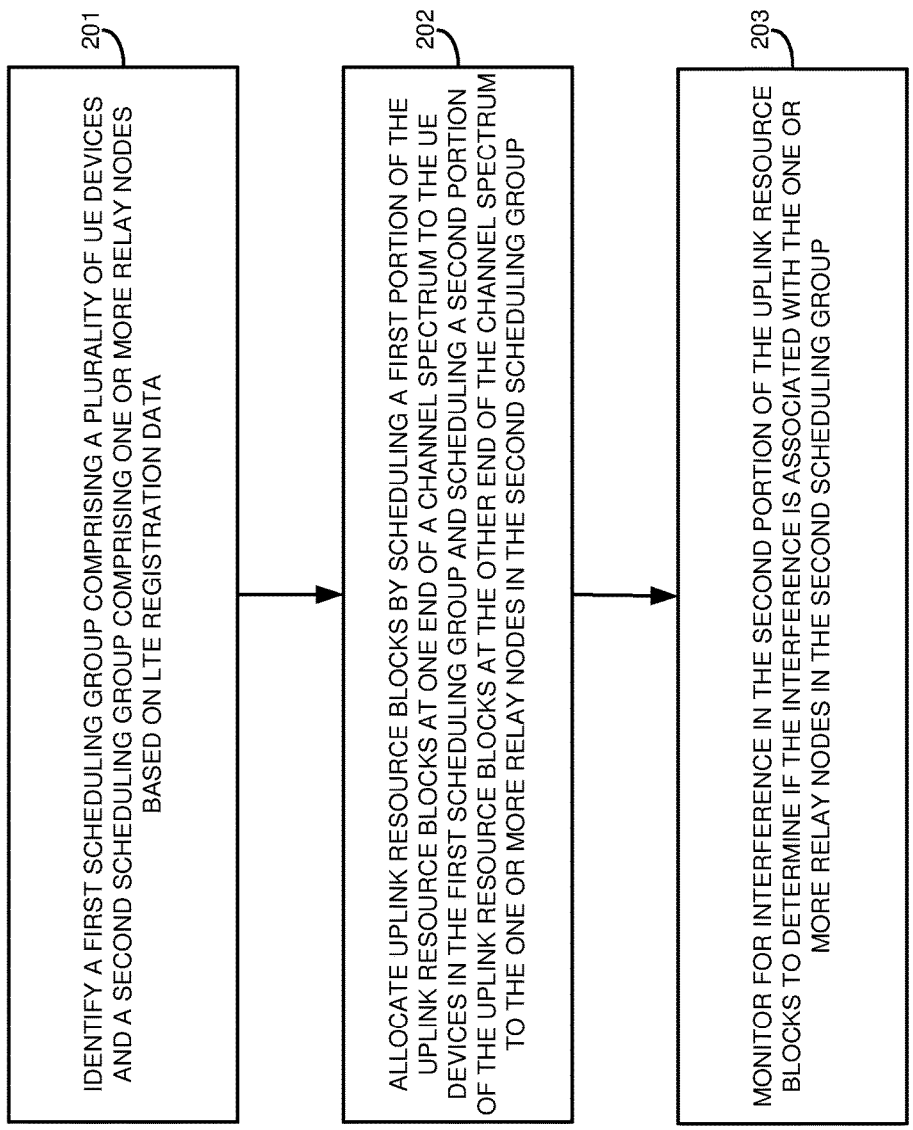
FIG. 2 is a flow diagram that illustrates an operation of the LTE communication system.

FIG. 2 is a flow diagram that illustrates an operation of LTE communication system 100. The steps of the operation are indicated below parenthetically. The operation of LTE communication system 100 shown in FIG. 2 may be employed by LTE base station 120 to facilitate identification of uplink interference in LTE communication system 100.

LTE base station 120 typically serves a plurality of UE devices and one or more relay nodes. For example, LTE base station 120 is shown in FIG. 1 as serving UE devices 101 and 102 and relay node 110. In order to illustrate its operations, the following discussion of the process shown in FIG. 2 will proceed with reference to LTE base station 120 serving UE devices 101 and 102 and relay node 110 as shown in FIG. 1, but note that the details provided in FIG. 1 are merely exemplary and not intended to limit the scope of the process to the specific implementation shown in FIG. 1.

In the operational flow of FIG. 2, LTE base station 120 identifies a first scheduling group comprising a plurality of UE devices 101-102 and a second scheduling group comprising one or more relay nodes 110 based on LTE registration data (201). In some examples, relay node 110 could comprise a relay backhaul UE, customer premises equipment (CPE), UE relay, or some other user relay node. As such, relay node 110 will appear to the macro LTE base station 120 as any other UE device on the network, such as UE devices 101 and 102. However, relay node 110 may be distinguished from other UE devices based on the LTE registration data associated with each of these network elements. In some examples, the LTE registration data could comprise a Public Land Mobile Network (PLMN), Access Point Name (APN), or any other information that may be provided by relay node 110 and UE devices 101 and 102 during LTE registration. For example, in order to provide differentiated services for relay node 110, network operators typically configure different PLMNs and/or APNs for relay node 110 and standard UE devices such as UE 101 and 102. Accordingly, LTE base station 120 could identify the first scheduling group comprising the plurality of UE devices 101-102 and the second scheduling group comprising the one or more relay nodes 110 based on the LTE registration data by identifying the first scheduling group comprising UE devices 101-102 associated with a first PLMN and/or a first APN and identifying the second scheduling group comprising relay node 110 associated with a second PLMN and/or second APN. Other techniques of determining the first and second scheduling groups are possible and within the scope of this disclosure.

LTE base station 120 allocates uplink resource blocks by scheduling a first portion of the uplink resource blocks at one end of a channel spectrum to the UE devices 101-102 in the first scheduling group and scheduling a second portion of the uplink resource blocks at the other end of the channel spectrum to the one or more relay nodes 110 in the second scheduling group (202). Since the UE devices 101-102 are now distinguished from the relay node 110 through the creation of the first and second scheduling groups, LTE base station 120 is able to separate their uplink traffic by scheduling uplink resource blocks for the two groups at opposite ends of the channel spectrum. For example, LTE base station 120 could schedule the first portion of the uplink resource blocks at one end of the channel spectrum to the UE devices 101-102 in the first scheduling group by starting at the one end of the channel spectrum and moving towards the other end of the channel spectrum for UE devices 101-102 in the first scheduling group. Similarly, LTE base station 120 could schedule the second portion of the uplink resource blocks at the other end of the channel spectrum to the one or more relay nodes 110 in the second scheduling group by starting at the other end of the channel spectrum and moving towards the one end of the channel spectrum for the relay nodes 110 in the second scheduling group. In some examples, the uplink resource blocks could comprise Physical Uplink Shared Channel (PUSCH) resource blocks. Over time, as network elements connect and disconnect from LTE base station 120, UE devices may be added or removed from the first scheduling group for UE devices, just as relay nodes may be added or removed from the second scheduling group for relay nodes. In any event, LTE base station 120 would continue to allocate the uplink resource blocks to the two scheduling groups as described above to achieve the goal of scheduling uplink traffic for relay nodes and standard UE devices on opposite ends of the system bandwidth.

LTE base station 120 monitors for interference in the second portion of the uplink resource blocks to determine if the interference is associated with the one or more relay nodes 110 in the second scheduling group (203). Since relay node 110 typically utilizes a greater antenna gain than UE devices 101 and 102, relay 110 is more likely to cause uplink interference than these standard UE devices. For example, when relay node 110 is transmitting uplink resource blocks using a higher-gain antenna, uplink performance for UE devices 101-102 may degrade due to an increase of overall Rise over Thermal (ROT), which indicates the ratio between the total interference received on a base station and the thermal noise. Thus, LTE base station 120 could monitor for the interference in the second portion of the uplink resource blocks to determine if the interference is associated with the one or more relay nodes 110 in the second scheduling group by identifying an increase in ROT attributable to the second portion of the uplink resource blocks to determine that the interference is associated with the one or more relay nodes 110 in the second scheduling group.

Advantageously, LTE base station 120 can distinguish sources of interference by grouping and scheduling uplink traffic for relay node 110 separately from other UE devices 101-102. By allocating uplink channel resources such that the system bandwidth assigned to relay node 110 is on the opposite end of the channel spectrum from resource blocks scheduled for UE client devices 101-102, LTE base station 120 can effectively track and identify uplink interference caused by relay node 110. Once identified as a source of uplink interference, relay node 110 can be repositioned or redeployed in an alternate location to mitigate the interference problem, thereby providing improved uplink performance and better quality of service for UE devices 101 and 102.

Now referring back to FIG. 1, UE devices 101-103 comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. UE devices 101-103 may also include a user interface, memory system, software, processing circuitry, or some other communication components. For example, UE devices 101-103 could comprise a telephone, transceiver, mobile phone, cellular phone, smartphone, computer, personal digital assistant (PDA), e-book, game console, mobile Internet device, wireless network interface card, media player, or some other wireless communication apparatus, including combinations thereof. UE devices 101-103 could comprise a dual-mode device capable of communicating over multiple wireless protocols, including LTE wireless networks and non-LTE wireless networks. Wireless network protocols that may be utilized by UE devices 101-103 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long-Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between UE devices 101-103 and a communication network.

Relay node 110 comprises RF communication circuitry and an antenna. The RF communication circuitry typically includes amplifiers, filters, RF modulators, transceivers, and signal processing circuitry. Relay node 110 may also comprise a router, server, memory device, software, processing circuitry, cabling, power supply, network communication interface, structural support, or some other communication apparatus. Relay node 110 may further comprises a processing system, such as a microprocessor, computer-readable storage device, and executable processing instructions, which may be used to provide access to communication services to various devices. For example, relay node 110 can receive access to communication services over a communication link provided by LTE base station 120 and provide this access to UE devices over associated wireless links. Relay node 110 could comprise a pico base station, wireless access node, Internet access node, telephony service node, wireless data access point, or some other wireless communication system—including combinations thereof. Some examples of relay node 110 include a UE relay node, relay backhaul UE, customer premises equipment (CPE), picocell, femtocell, base transceiver station (BTS), base station controller (BSC), radio base station (RBS), Node B, enhanced Node B (eNodeB), pico eNodeB, and others, including combinations thereof. Wireless network protocols that may be utilized by relay node 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format, including combinations thereof.

LTE base station 120 comprises RF communication circuitry and an antenna. The RF communication circuitry typically includes amplifiers, filters, RF modulators, transceivers, and signal processing circuitry. LTE base station 120 may also comprise a router, server, memory device, software, processing circuitry, cabling, power supply, network communication interface, structural support, or some other communication apparatus. LTE base station 120 could comprise a macro base station, Internet access node, telephony service node, wireless data access point, or some other wireless communication system—including combinations thereof. Some examples of LTE base station 120 include a base transceiver station (BTS), base station controller (BSC), radio base station (RBS), Node B, enhanced Node B (eNodeB), macro eNodeB, and others, including combinations thereof. Wireless network protocols that may be utilized by LTE base station 120 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format, including combinations thereof.

Communication network 130 comprises the core network of a wireless communication service provider, and could include routers, gateways, telecommunication switches, servers, processing systems, or other communication equipment and systems for providing communication and data services. In some examples, communication network 130 comprises a cellular voice and data network that can provide voice calls, text messages, data access, or other communication services provided over cellular or wireless communication networks. In some examples, communication network 130 includes equipment to provide wireless access to communication services within different coverage areas to user devices, route communications between content providers and user devices, and facilitate handoffs between equipment of different coverage areas, among other operations. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 can also comprise elements such as Mobility Management Entity (MME) equipment, Home Subscriber Servers (HSS), Policy and Charging Rules Function (PCRF) nodes, packet data network gateways (P-GW), serving gateways (S-GW), base stations, base transceiver stations (BTS), base station controllers (BSC), eNodeB equipment, mobile switching centers (MSC), home location registers (HLR), radio node controllers (RNC), authentication, authorization and accounting (AAA) equipment, access service network gateways (ASN-GW), packet data switching nodes (PDSN), Internet access nodes, database systems, or other communication and control equipment. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Wireless communication links 111-114 use the air or space as the transport medium. Wireless communication links 111-114 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication links 111-114 may each comprise many different signals sharing the same link. For example, each wireless communication link 111-114 could include multiple signals operating in a single propagation path comprising multiple communication sessions, frequencies, timeslots, transportation ports, logical transportation links, network sockets, IP sockets, packets, or communication directions, including combinations thereof.

Communication link 121 uses metal, air, space, optical fiber such as glass or plastic, or some other material as the transport medium—including combinations thereof. Communication link 121 could use various communication protocols, such as TDM, IP, Ethernet, telephony, optical networking, hybrid fiber coax (HFC), communication signaling, wireless protocols such as such as CDMA, GSM, UMTS, HSPA, EV-DO, EV-DO rev. A, B, and C, 3GPP LTE, LTE Advanced, WiMAX, Wi-Fi, Bluetooth, or some other communication format, including combinations thereof. Communication link 121 may be a direct link or could include intermediate networks, systems, or devices.

Figure 3:
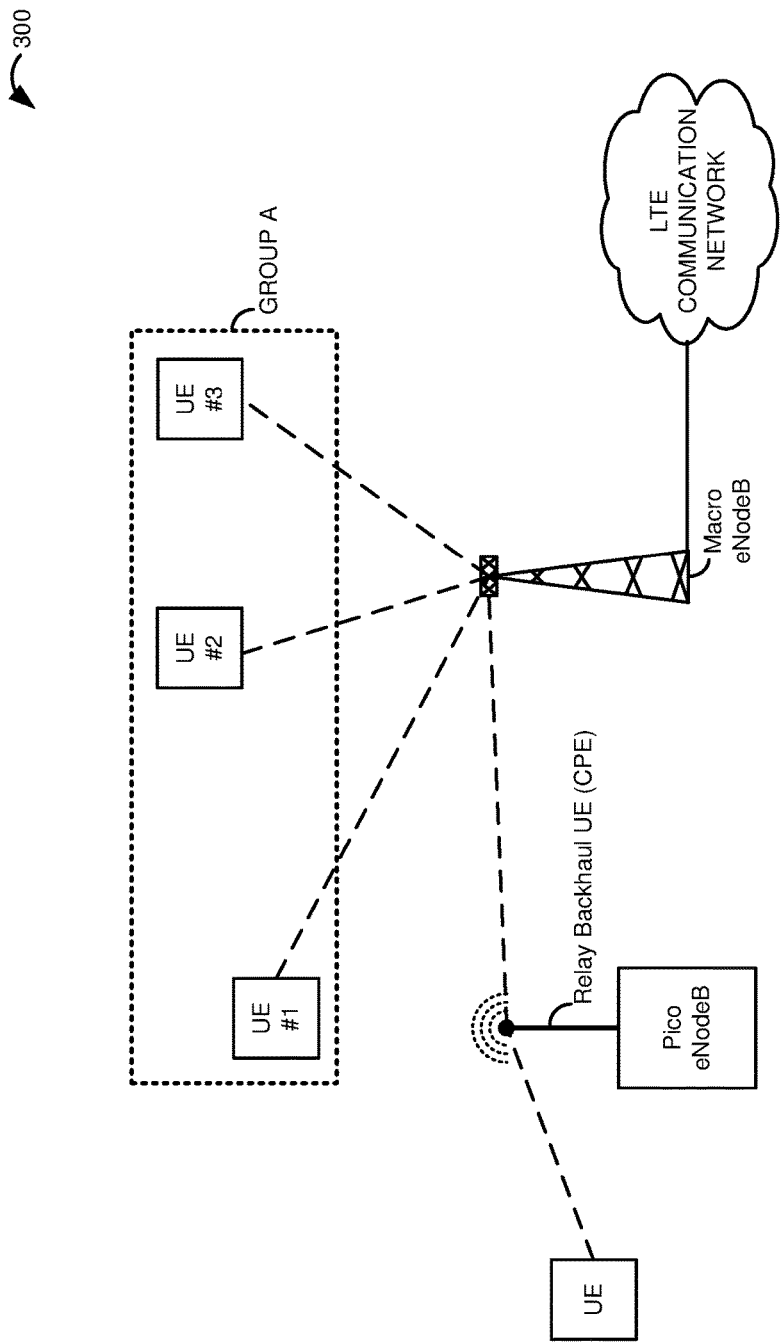
FIG. 3 is a block diagram that illustrates an LTE communication system in an exemplary embodiment.

FIG. 3 is a block diagram that illustrates LTE communication system 300 in an exemplary embodiment. LTE communication system 300 is an example of communication system 100, although communication system 100 may use alternative configurations and operations. LTE communication system 300 includes several user equipment (UE) devices, a pico eNodeB, and a macro eNodeB base station that is in communication with network elements of the LTE communication network. The LTE communication network may include LTE communication elements that are not shown to simplify the diagram, such as a mobility management entity (MME), serving gateway (S-GW), packet data network gateway (P-GW), home subscriber server (HSS), policy and charging rules function (PCRF), and other network elements typically found in an LTE communication network. The macro eNodeB provides an example of LTE base station 120, although base station 120 may use alternative configurations and operations.

In LTE communication system 300, the pico eNodeB comprises a relay backhaul UE, which in this example is customer premises equipment (CPE). For example, the relay backhaul UE may comprise an outdoor antenna system installed at the customer premises at a high altitude location from the ground to achieve better signal reception from the macro eNodeB. The relay backhaul UE enables a wireless backhaul solution for the pico eNodeB, operating to route data traffic for UE devices between the pico eNodeB and the macro eNodeB. The pico eNodeB and/or the relay backhaul UE provide an example of relay node 110, although node 110 may use alternative configurations and operations.

In operation, a UE device wirelessly connects to the pico eNodeB and the relay backhaul UE provides a wireless backhaul link to the macro eNodeB in order to provide communication services to the UE. Although the maximum transmit power of the relay backhaul UE is regulated by the LTE standard, its antenna gain is excluded from regulation. The relay backhaul UE antenna can therefore be operated at a much higher gain level than a normal UE client device, resulting in a much higher Equivalent Isotropically Radiated Power (EIRP) and achieving improved signal arrival at the macro eNodeB. However, the higher gain transmission power utilized by the relay backhaul UE may cause more uplink interference to other UEs and neighboring macro eNodeBs. As a result, uplink performance for normal UE client devices may degrade due to an increase in overall rise over thermal noise (ROT) caused by the relay backhaul UE.

In order to address the interference that may be caused by the relay backhaul UE, the macro eNodeB can attempt to distinguish interference sources by allocating uplink channel resources such that the channel locations assigned to UE client devices are separated from the channel locations assigned to relay backhaul UEs. However, a relay backhaul UE will appear to the macro eNodeB as a normal UE client device on the network, so the relay backhaul UE is not readily distinguishable from a regular UE device. In order to provide differentiated service for a UE relay due to its employment as a backhaul for a pico eNodeB, network operators typically configure different PLMNs and/or APNs for relay backhaul UEs and standard UE clients. Accordingly, the macro eNodeB can group uplink traffic from normal UE devices separately from relay backhaul UEs. For example, as shown in LTE communication system 300, the macro eNodeB scheduler has grouped the three UE devices that are connected directly to macro eNodeB into a group labeled "Group A" based on their usage of the same PLMN and/or APN during registration. The relay backhaul UE, which has been configured with a different PLMN and/or APN than the UE devices in Group A, could be included in another group, referred to as "Group B" in this example. The macro eNodeB scheduler would then allocate uplink resource blocks for data transmissions at opposite ends of the system bandwidth for the two groups, as shown in FIG. 4.

Figure 4:
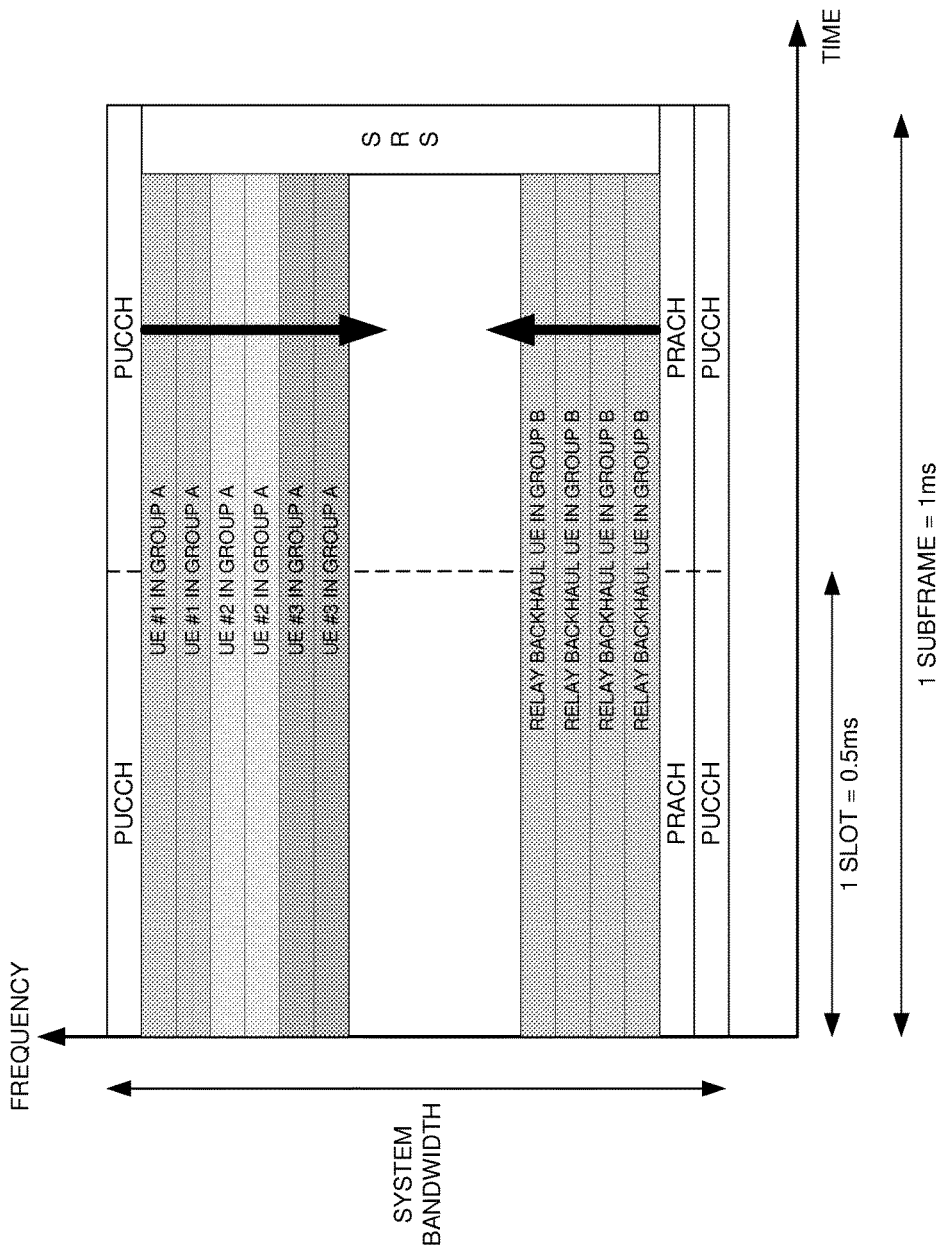
FIG. 4 is a scheduling diagram that illustrates an exemplary allocation of uplink resource blocks in an LTE communication system.

FIG. 4 is a scheduling diagram that illustrates an exemplary allocation of uplink resource blocks in LTE communication system 300. The scheduling diagram illustrates the available system bandwidth on the vertical axis labeled "Frequency", which is plotted over the horizontal "Time" axis. As shown in FIG. 4, one slot equals 0.5 milliseconds, and one subframe equals 1 millisecond. LTE uplink traffic is modulated by Single Carrier-Frequency Division Multiple Access (SC-FDMA), causing the macro eNodeB to schedule consecutively adjacent resource blocks to individual UE devices for uplink transmission. To maximize the total number of resource blocks that can be assigned to a single UE given the SC-FDMA regulation in LTE, the Physical Uplink Control Channel (PUCCH) and Physical Random Access Channel (PRACH) are typically allocated to the outer edges of system bandwidth, as illustrated in FIG. 4. Then, when scheduling the Physical Uplink Shared Channel (PUSCH) resource blocks for the connected UE devices and relay backhaul UE, the macro eNodeB starts at one edge of the system bandwidth for allocating resource blocks for UE devices in Group A, and starts at the opposite end of the channel spectrum for scheduling resource blocks for the relay backhaul UE in Group B. The macro eNodeB scheduler would then proceed to allocate uplink resource blocks for the two groups in opposite directions with the goal of keeping their respective traffic on opposite sides of the spectrum.

Thus, as shown in FIG. 4, the UE devices in Group A are allocated PUSCH resource blocks starting at the top of the available system bandwidth and proceeding in a downward direction (i.e., top-to-bottom), and the relay backhaul UE in Group B is allocated uplink resource blocks starting at the bottom of the channel spectrum and proceeding in an upward direction (i.e., bottom-to-top). If UEs in Group A are scheduled alone in a particular Transmission Time Interval (TTI), one hundred percent of PUSCH resource blocks can be scheduled, and the same is true for relay backhaul UEs in Group B. Further, if a certain channel bandwidth is dedicated for a specific group, the other group can use the rest of the non-dedicated PUSCH resource blocks. Interference can then be monitored in the resource blocks over time, enabling the macro eNodeB to determine to which group the interference may be attributed.

It should be noted that the macro eNodeB would not typically schedule uplink resource blocks in the above-described manner all of the time, but this scheduling technique could be triggered when problematic interference is detected or reported, or when activated by a network operator. This separated group scheduling algorithm could also begin when the macro eNodeB has no uplink resource blocks scheduled, which would help the scheduler keep new traffic from the two groups separated on opposite ends of the channel spectrum. Other triggers for toggling the scheduling algorithm on and off are possible and within the scope of this disclosure.

Beneficially, the macro eNodeB is able to schedule uplink resource blocks for UE devices on one end of the system bandwidth while scheduling uplink resource blocks for relay backhaul UEs on the opposite end of the spectrum. The macro eNodeB can then determine the average noise in the resource blocks and determine when a portion of the resource blocks exhibits above-average interference levels. If the higher levels of interference are attributable to the resource blocks associated with the relay backhaul UE group, those relay backhaul UEs can be identified as the cause of uplink interference for other UE devices and/or neighboring macro eNodeB base stations. The troublesome relay backhaul UEs can then be repositioned or relocated to alleviate the interference problem and improve the uplink performance for surrounding UE devices.

Figure 5:
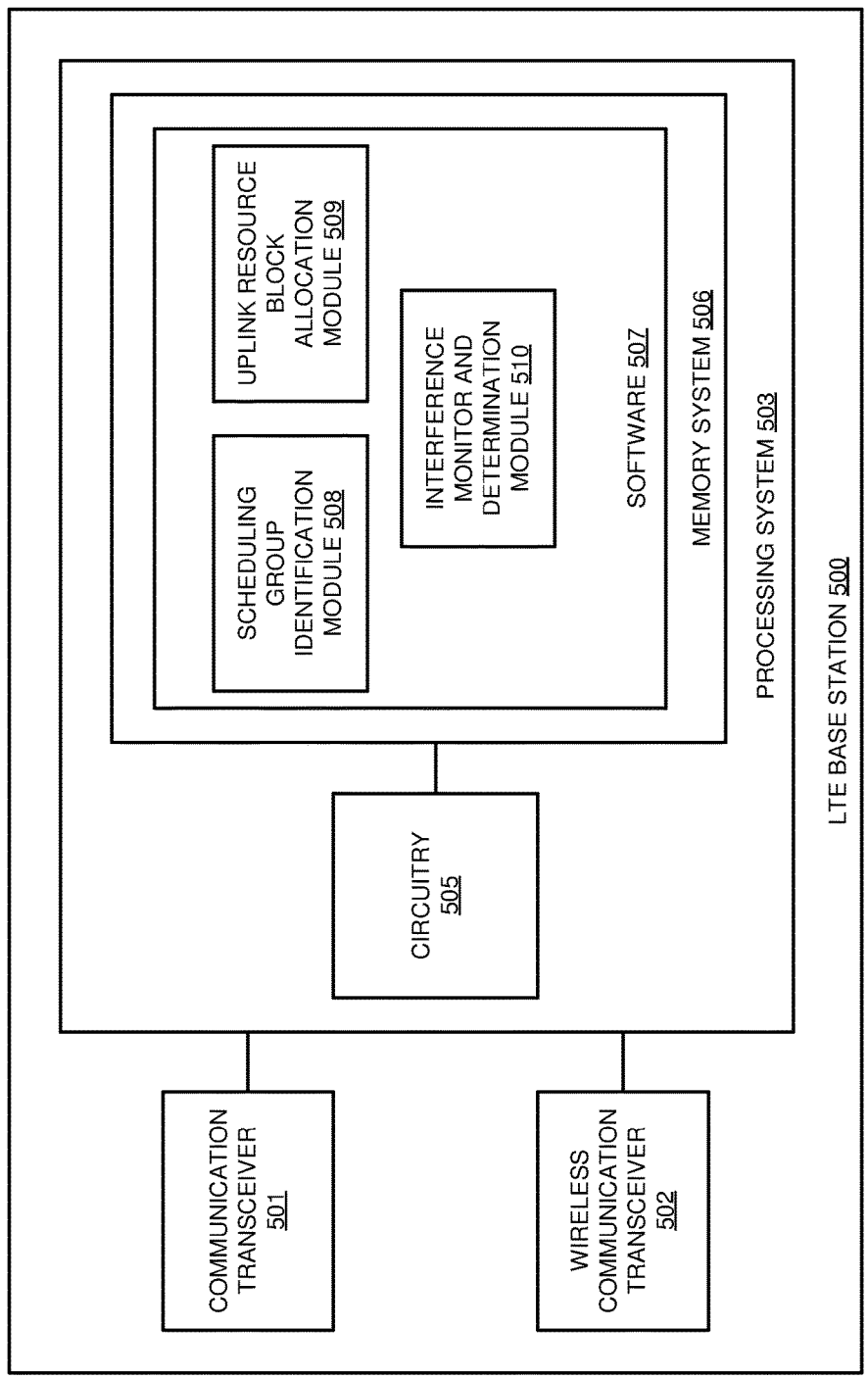
FIG. 5 is a block diagram that illustrates an LTE base station.

FIG. 5 is a block diagram that illustrates LTE base station 500. LTE base station 500 provides an example of LTE base station 120, although base station 120 may have alternative configurations. LTE base station 500 comprises communication transceiver 501, wireless communication transceiver 502, and processing system 503. Processing system 503 is linked to communication transceiver 501 and wireless communication transceiver 502. Processing system 503 includes processing circuitry 505 and memory system 506 that stores operating software 507. Operating software 507 comprises software modules 508-510.

Communication transceiver 501 comprises components that communicate over communication links, such as network cards, ports, RF transceivers, processing circuitry and software, or some other communication components. Communication transceiver 501 may be configured to communicate over metallic, wireless, or optical links. Communication transceiver 501 may be configured to use TDM, IP, Ethernet, optical networking, wireless protocols, communication signaling, or some other communication format, including combinations thereof.

Wireless communication transceiver 502 comprises RF communication circuitry and an antenna. The RF communication circuitry typically includes an amplifier, filter, RF modulator, and signal processing circuitry. Wireless communication transceiver 502 may also include a memory system, software, processing circuitry, or some other communication device. Wireless communication transceiver 502 may use various protocols, such as CDMA, GSM, UMTS, HSPA, EV-DO, EV-DO rev. A, B, and C, 3GPP LTE, WiMAX, Wi-Fi, Bluetooth, Internet, telephony, or some other wireless communication format, including combinations thereof.

Processing circuitry 505 comprises microprocessor and other circuitry that retrieves and executes operating software 507 from memory system 506. Processing circuitry 505 may comprise a single device or could be distributed across multiple devices, including devices in different geographic areas. Processing circuitry 505 may be embedded in various types of equipment. Examples of processing circuitry 505 include central processing units, application specific processors, logic devices, and/or any type of computer processing devices, including combinations thereof. Memory system 506 comprises a non-transitory computer readable storage medium readable by processing circuitry 505 and capable of storing software 507, such as a disk drive, flash drive, data storage circuitry, or some other hardware memory apparatus. Memory system 506 may comprise a single device or could be distributed across multiple devices, including devices in different geographic areas. Memory system 506 may be embedded in various types of equipment. In some examples, a computer apparatus could comprise memory system 506 and operating software 507. Operating software 507 may be implemented in program instructions and may be executed by processing system 503. Operating software 507 comprises computer programs, firmware, or some other form of machine-readable processing instructions. Operating software 507 may include an operating system, utilities, drivers, network interfaces, applications, or some other type of software. In this example, operating software 507 comprises software modules 508-510, although software 507 could have alternative configurations in other examples.

When executed by circuitry 505, operating software 507 directs processing system 503 to operate as described herein for LTE base station 120. In particular, operating software 507 may direct processing system 503 to identify a first scheduling group comprising a plurality of UE devices and a second scheduling group comprising one or more relay nodes based on LTE registration data. Operating software 507 further directs processing system 503 to allocate uplink resource blocks by scheduling a first portion of the uplink resource blocks at one end of a channel spectrum to the UE devices in the first scheduling group and scheduling a second portion of the uplink resource blocks at the other end of the channel spectrum to the one or more relay nodes in the second scheduling group. In addition, operating software 507 directs processing system 503 to monitor for interference in the second portion of the uplink resource blocks to determine if the interference is associated with the one or more relay nodes in the second scheduling group.

In this example, operating software 507 comprises a scheduling group identification software module 508 that identifies a first scheduling group comprising a plurality of UE devices and a second scheduling group comprising one or more relay nodes based on LTE registration data. Operating software 507 also comprises an uplink resource block allocation software module 509 that allocates uplink resource blocks by scheduling a first portion of the uplink resource blocks at one end of a channel spectrum to the UE devices in the first scheduling group and scheduling a second portion of the uplink resource blocks at the other end of the channel spectrum to the one or more relay nodes in the second scheduling group. Operating software 507 further comprises an interference monitor and determination software module 510 that monitors for interference in the second portion of the uplink resource blocks to determine if the interference is associated with the one or more relay nodes in the second scheduling group.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Long-Term Evolution (LTE) base station to facilitate identification of uplink interference, wherein the LTE base station serves a plurality of User Equipment (UE) devices and one or more relay nodes, the method comprising:

identifying a first scheduling group comprising the plurality of UE devices and a second scheduling group comprising the one or more relay nodes based on LTE registration data;

allocating uplink LTE resource blocks by scheduling a first portion of the uplink LTE resource blocks at one end of a channel spectrum to the UE devices in the first scheduling group and scheduling a second portion of the uplink LTE resource blocks at an opposite end of the channel spectrum to the one or more relay nodes in the second scheduling group; and monitoring for interference in the uplink LTE resource blocks to determine if the interference is associated with the one or more relay nodes in the second scheduling group.

2. The method of claim 1 wherein scheduling the first portion of the uplink LTE resource blocks at the one end of the channel spectrum to the UE devices in the first scheduling group comprises scheduling the first portion of the uplink LTE resource blocks by starting at the one end of the channel spectrum and moving towards the opposite end of the channel spectrum for the UE devices in the first scheduling group.

3. The method of claim 1 wherein scheduling the second portion of the uplink LTE resource blocks at the opposite end of the channel spectrum to the one or more relay nodes in the second scheduling group comprises scheduling the second portion of the uplink LTE resource blocks by starting at the opposite end of the channel spectrum and moving towards the one end of the channel spectrum for the one or more relay nodes in the second scheduling group.

4. The method of claim 1 wherein identifying the first scheduling group comprising the plurality of UE devices and the second scheduling group comprising the one or more relay nodes based on the LTE registration data comprises identifying the first scheduling group comprising the plurality of UE devices associated with a first Public Land Mobile Network (PLMN) and identifying the second scheduling group comprising the one or more relay nodes associated with a second PLMN.

5. The method of claim 1 wherein identifying the first scheduling group comprising the plurality of UE devices and the second scheduling group comprising the one or more relay nodes based on the LTE registration data comprises identifying the first scheduling group comprising the plurality of UE devices associated with a first Access Point Name (APN) and identifying the second scheduling group comprising the one or more relay nodes associated with a second APN.

6. The method of claim 1 wherein monitoring for the interference in the uplink LTE resource blocks to determine if the interference is associated with the one or more relay nodes in the second scheduling group comprises identifying an increase in rise over thermal (ROT) attributable to the second portion of the uplink LTE resource blocks to determine that the interference is associated with the one or more relay nodes in the second scheduling group.

7. The method of claim 1 wherein the uplink LTE resource blocks comprise Physical Uplink Shared Channel (PUSCH) resource blocks.

8. A computer apparatus to operate a Long-Term Evolution (LTE) base station to facilitate identification of uplink interference, wherein the LTE base station serves a plurality of User Equipment (UE) devices and one or more relay nodes, the apparatus comprising:

software instructions configured, when executed by one or more processors in the LTE base station, to direct the LTE base station to identify a first scheduling group comprising the plurality of UE devices and a second scheduling group comprising the one or more relay nodes based on LTE registration data, allocate uplink LTE resource blocks by scheduling a first portion of the uplink LTE resource blocks at one end of a channel spectrum to the UE devices in the first scheduling group and scheduling a second portion of the uplink LTE resource blocks at an opposite end of the channel spectrum to the one or more relay nodes in the second scheduling group, and monitor for interference in the uplink LTE resource blocks to determine if the interference is associated with the one or more relay nodes in the second scheduling group; and at least one non-transitory computer-readable storage medium coupled to the one or more processors, storing the software instructions.

9. The apparatus of claim 8 wherein the software instructions configured to direct the LTE base station to allocate the uplink LTE resource blocks by scheduling the first portion of the uplink LTE resource blocks at the one end of the channel spectrum to the UE devices in the first scheduling group comprises the software instructions configured to direct the LTE base station to allocate the uplink LTE resource blocks by scheduling the first portion of the uplink LTE resource blocks by starting at the one end of the channel spectrum and moving towards the opposite end of the channel spectrum for the UE devices in the first scheduling group.

10. The apparatus of claim 8 wherein the software instructions configured to direct the LTE base station to allocate the uplink LTE resource blocks by scheduling the second portion of the uplink LTE resource blocks at the opposite end of the channel spectrum to the one or more relay nodes in the second scheduling group comprises the software instructions configured to direct the LTE base station to allocate the uplink LTE resource blocks by scheduling the second portion of the uplink LTE resource blocks by starting at the opposite end of the channel spectrum and moving towards the one end of the channel spectrum for the one or more relay nodes in the second scheduling group.

11. The apparatus of claim 8 wherein the software instructions configured to direct the LTE base station to identify the first scheduling group comprising the plurality of UE devices and the second scheduling group comprising the one or more relay nodes based on the LTE registration data comprises the software instructions configured to direct the LTE base station to identify the first scheduling group comprising the plurality of UE devices associated with a first Public Land Mobile Network (PLMN) and identify the second scheduling group comprising the one or more relay nodes associated with a second PLMN.

12. The apparatus of claim 8 wherein the software instructions configured to direct the LTE base station to identify the first scheduling group comprising the plurality of UE devices and the second scheduling group comprising the one or more relay nodes based on the LTE registration data comprises the software instructions configured to direct the LTE base station to identify the first scheduling group comprising the plurality of UE devices associated with a first Access Point Name (APN) and identify the second scheduling group comprising the one or more relay nodes associated with a second APN.

13. The apparatus of claim 8 wherein the software instructions configured to direct the LTE base station to monitor for the interference in the uplink LTE resource blocks to determine if the interference is associated with the one or more relay nodes in the second scheduling group comprises the software instructions configured to direct the LTE base station to identify an increase in rise over thermal (ROT) attributable to the second portion of the uplink LTE resource blocks to determine that the interference is associated with the one or more relay nodes in the second scheduling group.

14. The apparatus of claim 8 wherein the uplink LTE resource blocks comprise Physical Uplink Shared Channel (PUSCH) resource blocks.

15. A Long-Term Evolution (LTE) base station to facilitate identification of uplink interference, wherein the LTE base station serves a plurality of User Equipment (UE) devices and one or more relay nodes, the LTE base station comprising:

a processing circuitry operatively coupled to one or more memories configured to identify a first scheduling group comprising the plurality of UE devices and a second scheduling group comprising the one or more relay nodes based on LTE registration data, allocate uplink LTE resource blocks by scheduling a first portion of the uplink LTE resource blocks at one end of a channel spectrum to the UE devices in the first scheduling group and scheduling a second portion of the uplink LTE resource blocks at an opposite end of the channel spectrum to the one or more relay nodes in the second scheduling group, and monitor for interference in the uplink LTE resource blocks to determine if the interference is associated with the one or more relay nodes in the second scheduling group.

16. The LTE base station of claim 15 wherein the processing system configured to allocate the uplink LTE resource blocks by scheduling the first portion of the uplink LTE resource blocks at the one end of the channel spectrum to the UE devices in the first scheduling group comprises the processing system configured to allocate the uplink LTE resource blocks by scheduling the first portion of the uplink LTE resource blocks by starting at the one end of the channel spectrum and moving towards the opposite end of the channel spectrum for the UE devices in the first scheduling group.

17. The LTE base station of claim 15 wherein the processing system configured to allocate the uplink LTE resource blocks by scheduling the second portion of the uplink LTE resource blocks at the opposite end of the channel spectrum to the one or more relay nodes in the second scheduling group comprises the processing system configured to allocate the uplink LTE resource blocks by scheduling the second portion of the uplink LTE resource blocks by starting at the opposite end of the channel spectrum and moving towards the one end of the channel spectrum for the one or more relay nodes in the second scheduling group.

18. The LTE base station of claim 15 wherein the processing system configured to identify the first scheduling group comprising the plurality of UE devices and the second scheduling group comprising the one or more relay nodes based on the LTE registration data comprises the processing system configured to identify the first scheduling group comprising the plurality of UE devices associated with a first Public Land Mobile Network (PLMN) and identify the second scheduling group comprising the one or more relay nodes associated with a second PLMN.

19. The LTE base station of claim 15 wherein the processing system configured to identify the first scheduling group comprising the plurality of UE devices and the second scheduling group comprising the one or more relay nodes based on the LTE registration data comprises the processing system configured to identify the first scheduling group comprising the plurality of UE devices associated with a first Access Point Name (APN) and identify the second scheduling group comprising the one or more relay nodes associated with a second APN.

20. The LTE base station of claim 15 wherein the processing system configured to monitor for the interference in the uplink LTE resource blocks to determine if the interference is associated with the one or more relay nodes in the second scheduling group comprises the processing system configured to identify an increase in rise over thermal (ROT) attributable to the second portion of the uplink LTE resource blocks to determine that the interference is associated with the one or more relay nodes in the second scheduling group.

* * * * *